(12) United States Patent
Flett

(10) Patent No.: US 10,445,712 B2
(45) Date of Patent: Oct. 15, 2019

(54) BASIC INPUT/OUTPUT SYSTEM (BIOS) CREDENTIAL MANAGEMENT

(71) Applicant: NCR Corporation, Duluth, GA (US)

(72) Inventor: Graham Flett, Scotland (GB)

(73) Assignee: NCR Corporation, Atlanta, GA (US)

( * ) Notice: Subject to any disclaimer, the term of this patent is extended or adjusted under 35 U.S.C. 154(b) by 353 days.

(21) Appl. No.: 14/973,118

(22) Filed: Dec. 17, 2015

(65) Prior Publication Data

US 2017/0178105 A1 Jun. 22, 2017

(51) Int. Cl.
*G06Q 20/18* (2012.01)
*G06F 21/34* (2013.01)
*G06F 21/60* (2013.01)
*G07F 9/00* (2006.01)
*H04L 29/06* (2006.01)

(52) U.S. Cl.
CPC .......... *G06Q 20/18* (2013.01); *G06F 21/34* (2013.01); *G06F 21/604* (2013.01); *G07F 9/006* (2013.01); *H04L 63/083* (2013.01); *G06F 2221/2137* (2013.01)

(58) Field of Classification Search
None
See application file for complete search history.

(56) References Cited

U.S. PATENT DOCUMENTS

| 2004/0054587 | A1* | 3/2004 | Dev | G06Q 20/403 705/14.1 |
| 2015/0161392 | A1* | 6/2015 | Krummel | G06F 21/554 726/22 |
| 2016/0323276 | A1* | 11/2016 | Flett | H04L 63/102 |
| 2017/0061130 | A1* | 3/2017 | Ghafoor | G06F 9/4406 |
| 2017/0061413 | A1* | 3/2017 | Vaddadi | G06Q 20/206 |
| 2017/0124329 | A1* | 5/2017 | Ghafoor | G06F 21/575 |

* cited by examiner

*Primary Examiner* — Fateh M Obaid

(74) *Attorney, Agent, or Firm* — Schwegman, Lundberg & Woessner

(57) ABSTRACT

A Basic Input/Output System (BIOS) agent on a Self-Service Terminal (SST) coordinates with a BIOS credential manager that determines when to communicate a BIOS credential for the SST and when to re-generate and re-set a new BIOS credential for the SST.

8 Claims, 4 Drawing Sheets

BASIC INPUT/OUTPUT SYSTEM (BIOS) CREDENTIAL MANAGEMENT

BACKGROUND

Automated Teller Machines (ATM) are in general believed to be relatively secure devices since they handle consumer financial transactions. However, ATMs are susceptible to malware, viruses, and eavesdropping just like any other device having memory and processor capabilities.

One ATM resource that is particularly valuable to the ATM is the Basic Input/Output System (BIOS), which is utilized to boot the ATM, set resources configurations, and the like. Unauthorized access to the BIOS can create substantial security breaches at the ATM.

However, an ATM is often serviced on site by a service (field) engineer for purposes of diagnostic testing, software upgrades, peripheral replacements, and the like. Because ATM security is an issue more and more security enhancements on the ATM are requiring that the BIOS be password protected, such that the ATM can only boot from the main hard drive with a known password for the ATM's BIOS.

This makes it difficult for the field engineers to use bootable diagnostic compact-disks (CDs), such as a bootable system application to analyze problems on a faulty ATM (e.g., an ATM existing system application from the hard drive is replaced for diagnostic testing from a CD during boot of the BIOS, such a situation cannot occur when the BIOS only permits password booting from the main hard drive of the ATM). Moreover, a particular fault may require the field engineer to access the BIOS, which means that the field engineer has to have the ATM BIOS password to effectively service the ATM.

Managing passwords for ATMs is problematic because BIOS passwords for each ATM should be unique and/or changed frequently to meet minimal security requirements, and, perhaps government compliance regulations. As stated above, the field engineers may require access to the BIOS in order to diagnose and fix issues with the ATMs. But, giving the field engineer a BIOS password presents a significant security risk, as the engineer may lose or actively give away the BIOS password to someone unauthorized to have such password; thereby giving hackers access to the BOIS on the ATM. The engineer may also take actions while working on the AMT that may make the BOIS less secure through such actions.

Therefore there is a need for improved BIOS credential management.

SUMMARY

In various embodiments, methods and a Self-Service Terminal BIOS credential management are presented.

According to an embodiment, a method for BIOS credential management is presented. Specifically, an entry is created in a data store for a credential to access a Basic Input/Output System (BIOS) of a Self-Service Terminal (SST) and the credential is communicated to a service engineer device operated by a service engineer.

DETAILED DESCRIPTION

Figure 1:
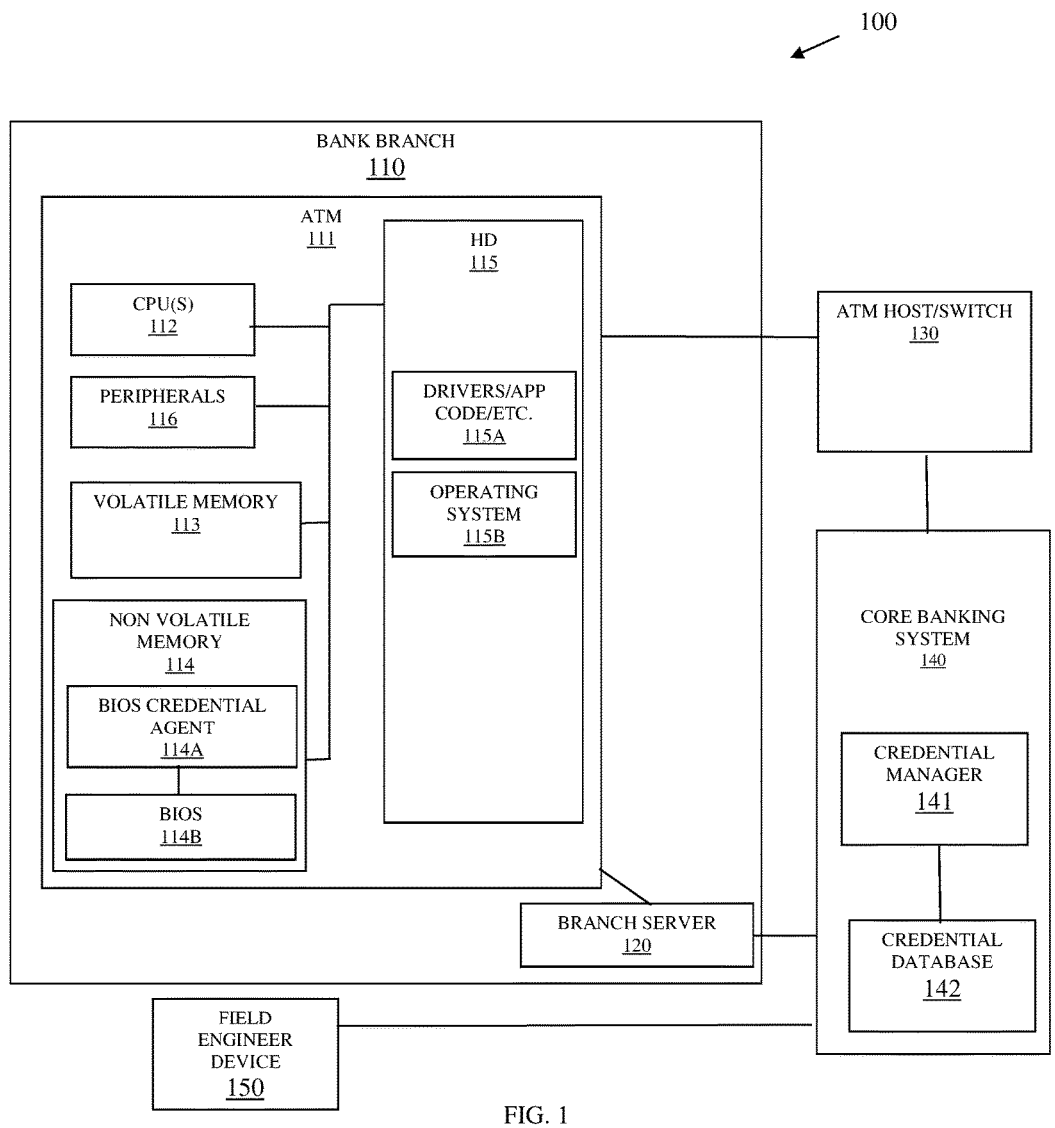
FIG. 1 is a diagram of a banking system for BIOS credential management on an Automated Teller Machine (ATM), according to an example embodiment.

FIG. 1 is a diagram of a banking system 100 for BIOS credential management on an Automated Teller Machine (ATM), according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of BIOS credential management, presented herein and below.

The banking system 100 includes a bank branch 110, an ATM host/switch 130, a core banking system 140, and a service (field engineer) device 150. The bank branch 110 includes: an ATM 111 and a branch server 120.

The ATM 111 includes one or more Central Processing Units (CPU(s) 112, volatile memory 113, non-volatile memory 114, a Hard Drive (HD) 115 (which may or may not be encrypted and dynamically decrypted as needed), and multiple peripheral devices 116. The non-volatile memory 114 includes new and novel BIOS credential agent 114A and a BIOS 114B. The HD 115 includes drivers/application code/etc. 115A and an operating system (OS) 115B.

During operation, the BIOS 114B includes a key (credential) that it expects to be entered through an interface to the ATM 111 when the BIOS 114B is initiated from within the non-volatile memory 114. If the credential is properly matched to what is expected by the BIOS 114B (hashed value or stored value for the credential), then the BIOS 114 proceeds to load the OS 115B from the HD 115 for execution in the volatile memory 113 by the CPUs 112, the OS 115B and/or the BIOS 114 will also load device drivers 115A for the peripherals 116 of the ATM 111. The peripherals 116 can include a variety of devices, such as but not limited to, an encrypted PINPAD, a touchscreen, a receipt printer, a cash dispenser, a media recycler, a deposit module, and other peripheral devices 116.

Typically, the software modules or scripts for changing the credential that is needed for accessing the BIOS 114B and the credential itself (or a hash value for the credential) resides on and never leaves the ATM 111. Even when the credential is separately administered for the BIOS 114B of the ATM 111, changing the credential is slow and requires manually visiting each ATM 111 accessing the BIOS interface and changing that ATM's credential. This is a very inefficient process and creates a variety of security holes once a field engineer has the credential for the BIOS 114B of the ATM 111. I As will be demonstrated herein, the system 100 manages BIOS credentials for an entire ATM estate (a plurality of ATMs that span multiple bank branches. This is managed primarily through the credential manager 141 and the credential database 142 of the core banking system 140. Although it is noted that the credential manager 141 and the credential database 142 can reside in a third-party server remote from the core banking system 140 to an enterprise responsible for servicing and maintaining the ATMs. So, the location of the credential manager 141 and the credential database 142 is shown for illustration and as one possible embodiment, as other embodiments can have these modules remote from the core banking system 140 over a network connection.

The credential manager 142 is aware of when a field engineer has a job for a particular ATM 111 and can authorize access for that field engineer being provided a specific BIOS credential for the ATM 111. The credential database 142 includes entries for all ATMs in a fleet of ATMs being managed by an enterprise, each entry includes a unique ATM identifier, and a current credential (such as a password) for that unique ATM identifier. In some embodiments, each entry may also include other information such as the last date and time the current password was changed for the given ATM 111, a field engineer that last accessed that ATM 111 and the date and time for such access, and a flag indicating whether the current password has been sent to a field engineer and if so which filed engineer and the data and time (perhaps the related job or service number by which the field engineer was sent the password). Other useful and configurable information can be included in each entry of the credential database 142. The unique key into the credential database is the ATM serial number or unique identifier, which identifies a record or entry for that unique serial number along with the current password assigned to the BIOS 114B of that ATM 111.

Some example usage cages are now presented with reference to the various components of the FIG. 1.

In a usage case #1, each ATM within an estate or fleet of ATMs controlled by an enterprise has a random BIOS password initially deployed through cooperation of the credential manager 141 and the BIOS credential agent 114A (it is noted that each ATM includes its own independent executing instance of the BIOS credential agent 114A).

So on startup, the credential manager 141 sends a message to each of the BIOS credential Agents (such as 114A for ATM 111), the BIOS credential Agents respond with ATMs serial number or unique identifiers. This may also include a variety of information sent from the agents such as peripheral identifiers for connected peripherals 116, size and type of the HD 115 and other configuration information for each agents ATM. The credential manager 141 then processes this information to generate a random password (credential) for each ATM (such as ATM 111) in the fleet or estate).

The credential manager 141 then creates a single record for each ATM (such as ATM 111), within the credential database 142, that includes that ATM's unique serial number and the randomly generated password needed to access the BIOS (such as 114B) for that ATM (such as ATM 111).

Next, the credential manager 141 causes the agent 114A to set the ATM's password as stored in the credential database 142 on the ATM 111 (this is done for all ATMs in the estate or fleet of ATMs).

At this point, and upon initial configuration each ATM in the fleet of ATM's now has a unique randomly generated BIOS password for accessing its BIOS that is unique stored in a record for each ATM within the credential database 142.

In usage case #2, a field engineer, who is operating a field engineer device (150), such as a laptop, phone, tablet, wearable processing device, and the like, needs access to the ATM 111 for some time of service job. The field engineer uses the device 150 to initially authenticate to the field engineer's job server (which may be separate from where the credential manager 141 is located). Assuming the field engineer is properly authenticated and is permitted to have a BIOS credential for the BIOS 114B of the ATM 111, the credential manager 141 sends the current password (credential assigned to the ATM 111 by searching the credential database 142 with an identifier or serial number for the ATM 111 (as obtained from the job number or information provided by the field engineer); the results of the search includes the currently assigned and recognized BIOS password for the BIOS 114B of the ATM 111. A policy may then be evaluated or a profile accessed, which indicates how the credential manager 141 is to send the BIOS password (such as through an email or a text to the device 150).

Once the field engineer has completed the required access to the BIOS 114B, the field engineer's job server receives notice of job completed which can be communicated automatically to the credential manager 141. The credential manager can then automatically generate a new random password for the ATM 111 and store it in the proper entry for the ATM 111 in the credential database 142. Next, the credential manager 141 contacts the BIOS credential agent 114A to access the BIOS 114B password setting interface and set the password on the BIOS 114B for the ATM 111 as the new randomly generated password. So, the previously used password for the BIOS 114B given to the field engineer (through the device 150) is useless at this point and cannot be used any longer for accessing the BIOS 114B because as soon as the field engineer closed the job processing was triggered to automatically repurpose a new BIOS password for the BIOS 114B of the ATM 111. Therefore, the password received by the field engineer can be lost, stolen or even maliciously leaked by the field engineer and such knowledge of the password would be of no use in compromising the ATM 111 and its BIOS 114B.

In usage case #3, if an enterprise desires or compliance requires that passwords be changed every so many days, then the credential manager 141 may repurpose and change all passwords for all BIOSs in the ATM fleet or estate of the enterprise. This can be managed automatically without visiting the ATMs physically through cooperation between the credential manager 141 and each ATM's instance of its BIOS credential agent (such as agent 114A). As the passwords are given to field engineers through the credential manager 141, the field engineer is always assured of having a proper BIOS password for a proper BIOS of a particular ATM.

As discussed, the credential manager 141 permits each ATM to have its own unique and random BIOS password and removes all need for human interaction and attention, which reduces the risks of incorrect BIOS passwords being communicated to filed engineers and which reduces the risks that passwords are leaked to malicious third parties.

Moreover, since the credential manager 141 is aware of each password given out (through a flag in each entry of the database 142 (as discussed above)), the credential manager 141 can automatically generate and set (through the agent 114A) a new password to preserve security of the ATM 111. Automatic re-flashing of the BIOS 114B can also occur to ensure that the field engineer cannot intentionally or unintentionally leave the ATM 111 in an insecure state (re-flashing can be achieved via the agent 114A as well).

In an embodiment, the field engineer job server and system is connected and communicates with the credential manager 141 from different network servers.

In an embodiment, the field engineer job server and system is connected and communicates with the credential manager 141 from a same server.

Some of embodiments of the FIG. 1 and other embodiments are now discussed with reference to the FIGS. 2-4.

Figure 2:
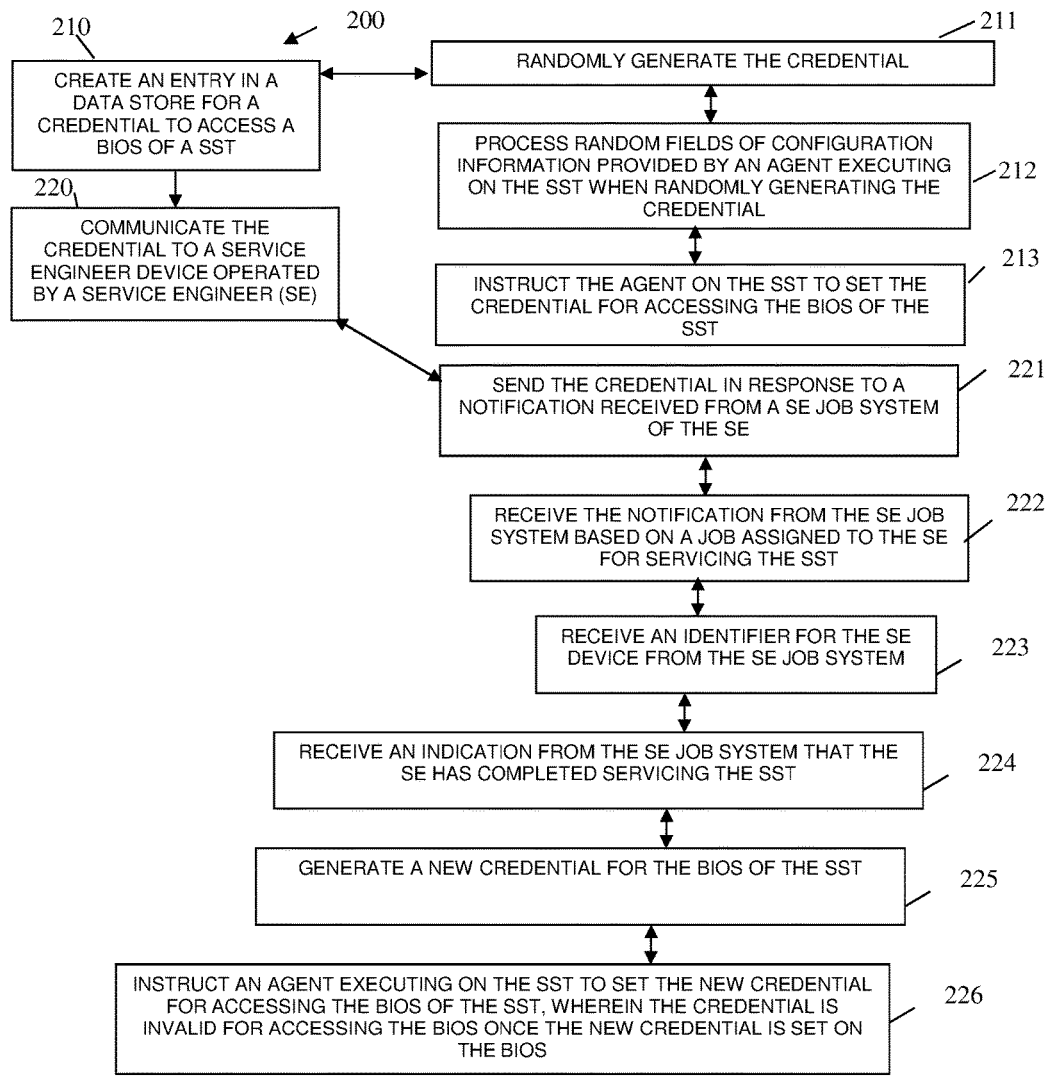
FIG. 2 is a diagram of a method for BIOS credential management, according to an example embodiment.

FIG. 2 is a diagram of a method 22 for BIOS credential management, according to an example embodiment. The software module(s) that implements the method 200 is referred to as a "Self-Service Terminal (SST) BIOS credential manager." The SST BIOS credential manager is implemented as executable instructions programmed and residing within memory and/or a non-transitory computer-readable (processor-readable) storage medium and executed by one or more processors of a device. The processor(s) of the device that executes the SST BIOS credential manager are specifically configured and programmed to process the SST BIOS credential manager. The SST BIOS credential manager has access to one or more network connections during its processing. The network connections can be wired, wireless, or a combination of wired and wireless.

In an embodiment, the device that executes the SST BIOS credential manager is a server associated with the core banking system 140 of the FIG. 1.

In an embodiment, the device that executes the SST BIOS credential manager is a server that is in communication with a field engineer's job system.

In an embodiment, the device that executes the SST BIOS credential manager is independent of a core banking system 140 and a field engineer's job system.

In an embodiment, the SST BIOS credential manager is the credential manager 141 of the FIG. 1. In an embodiment, the SST BIOS credential manager interacts with agents on SSTs, such as agent 114A in the manners discussed above with reference to the FIG. 1 and below with the discussion of the FIG. 2.

In an embodiment, the credentials maintained, managed, and distributed by the SST BIOS credential manager are for SSTs. In an embodiment, at least one SST or a grouping of the SSTs is an ATM. In an embodiment the ATM is the ATM 111 of the FIG. 1. In an embodiment, at least one SST is a kiosk.

It is to be noted that although the SST BIOS credential manager is discussed with reference to managing a BIOS credential for a single SST that this is not always the case as the SST BIOS credential manager may processing to manage an entire fleet or estate of SSTs of one or more enterprises.

At 210, the SST BIOS credential manager creates an entry in a data store for a credential to access a BIOS of the SST. In an embodiment, the entry, minimally includes, an identifier or serial number for the SST and the credential. In an embodiment, the entry includes each of the sample fields discussed above with reference to the FIG. 1. In an embodiment, the data store is the credential data store 142 of the FIG. 1.

According to an embodiment, at 211, the SST BIOS credential manager randomly generates the credential. That is the randomly generated credential is uniquely assigned to just the SST and can include a variety of random data (some of which may be specific to the SST).

For example, in an embodiment of 211 and at 212, the SST BIO credential manager processes random fields for configuration information provided by an agent executing on the SST when randomly generating the credential. In an embodiment, the agent is the BIOS credential agent 114A of the FIG. 1.

In an embodiment of 212 and at 213, the SST BIOS credential manager instructs the agent on the SST to set the credential for accessing the BIOS of the SST. This can be to replace an existing credential with the provided generated credential or can be an initial credential being set for the BIOS of the SST.

At 220, the SST BIOS credential manager communicates the credential to a service engineer device operated by a service engineer.

In an embodiment, the service engineer device is the service engineer device 150 of the FIG. 1.

In an embodiment, the service engineer device is one of: a tablet, a laptop, a phone, a wearable processing device, etc.

In an embodiment, at 221, the SST BIOS credential manager sends the credential in response to a notification received from a service engineer job system of the service engineer. That is, the SST BIOS credential manager is interfaced to or receives notification from the service engineer job system (the system that assigns service jobs to service engineers and managers the service jobs and the service jobs relevant to the SST).

In an embodiment of 221 and at 222, the SST BIOS credential manager receives the notification from the service engineer job system based on a job assigned to the service engineer for servicing the SST.

In an embodiment of 222 and at 223, the SST BIOS credential manager receives an identifier for the service engineer device from the service engineer job system, which permits the SST BIOS credential manager to locate where the credential is to be communicated.

In an embodiment of 223 and at 224, the SST BIOS credential manager receives an indication from the service engineer job system that the service engineer has completed servicing the SST.

In an embodiment of 224 and at 225, the SST BIOS credential manager generates a new credential for the BIOS of the SST based on the job that the service engineer was doing in servicing the SST being identified as completed.

In an embodiment of 225 and at 226, the SST BIOS credential manager instructs and agent executing on the SST to set the new credential for accessing the BIOS of the SST. The credential is invalid for accessing the BIOS once the new credential is set on the BIOS.

So, the service engineer gets a one-time use credential for accessing the BIOS of the SST, which becomes invalid once the session associated with the service job completes on the SST because the SST BIOS credential manager randomly generates a new credential and has the agent reset that credential on the SST. The BIOS is also re-flashed in memory on the SST when the new credential is set by the agent.

Figure 3:
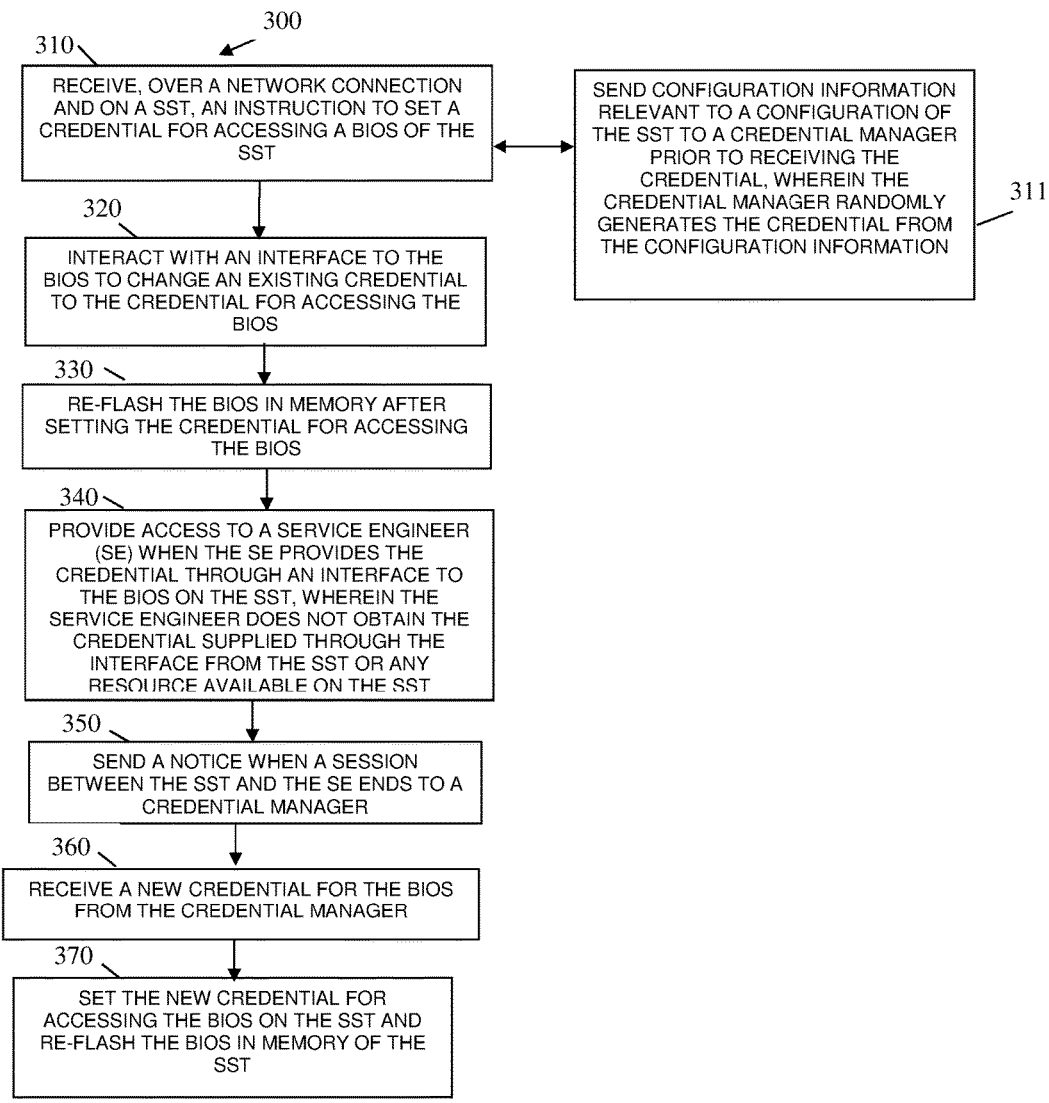
FIG. 3 is a diagram of another method for BIOS credential management, according to an example embodiment.

FIG. 3 is a diagram of another method 300 for BIOS credential management, according to an example embodiment t. The software module(s) that implements the method 300 is referred to as a "SST BIOS credential agent." The SST BIOS credential agent is implemented as executable instructions programmed and residing within memory and/or a non-transitory computer-readable (processor-readable) storage medium and executed by one or more processors of a device. The processors that execute the SST BIOS credential agent are specifically configured and programmed to process the SST BIOS credential agent. The SST BIOS credential agent has access to one or more network connections during its processing. The network connections can be wired, wireless, or a combination of wired and wireless.

In an embodiment, the device that executes the SST BIOS credential agent is an SST. In an embodiment, the SST is the ATM 111 of the FIG. 1. In an embodiment, the SST is a kiosk.

In an embodiment, the SST BIOS credential agent is the BIOS credential agent 114A of the FIG. 1.

In an embodiment, the SST BIOS credential agent interacts with the SST BIOS credential manager of the FIG. 2.

In an embodiment, a fleet of SSTs are provided such that each SST includes its own operating instance of the SST BIOS credential agent.

At 310, the SST BIOS credential agent receives, over a network connection and on the SST, an instruction to set a credential for accessing a BIOS of the SST. In an embodiment, the instruction is received from the configuration manager 141 of the FIG. 1. In an embodiment, the instruction is received from the SST BIOS credential manager of the FIG. 2.

In an embodiment, at 311, the SST BIOS credential agent sends configuration information relevant to a configuration of the SST to a credential manager (such as credential manager 141 and/or SST BIOS credential manager of the FIG. 2) prior to receiving the credential. The credential manager randomly generates the credential from the configuration information. Example configuration information was presented above with reference to the discussion of the FIG. 1.

At 320, the SST BIOS credential agent interacts with an interface to the BIOS to change an existing credential to the credential for accessing the BIOS. So, the randomly generated credential supplied by the configuration manager replaces any existing credential used for accessing the BIOS of the SST.

According to an embodiment, at 330, the SST BIOS credential agent re-flashes the BIOS in memory after setting the credential for accessing the BIOS. This ensures that any changes in the BIOS are reset and access to the BIOS requires the set credential.

In an embodiment of 330 and at 340, the SST BIOS credential agent provides access to a service engineer when the service engineer provides the credential through an interface to the BIOS on the SST. The service engineer does not obtain the credential supplied through the interface from the SST or from any resource available on the SST. That is the service engineer only obtains the credential from the credential manager.

In an embodiment of 240 and at 350, the SST BIOS credential agent sends a notice when a session between the SST and the service engineer ends to a credential manager. This was discussed as coming from the service engineer job system above but can also come from the SST BIOS credential agent based on a service engineer log off or based on a period of inactivity by the service engineer when accessing the SST (and based on a preconfigured period of inactivity time).

In an embodiment of 350 and at 360, the SST BIOS credential agent receives a new credential for the BIOS from the credential manager based on the session being over between the SST and the service engineer.

In an embodiment of 360 and at 370, the SST BIOS credential agent sets the new credential for accessing the BIOS on the SST (using the BIOS interface available on the SST) and re-flashes the BIOS in memory of the SST to ensure the SST is unavailable and needs accessed via the newly set credential for accessing the BIOS.

Figure 4:
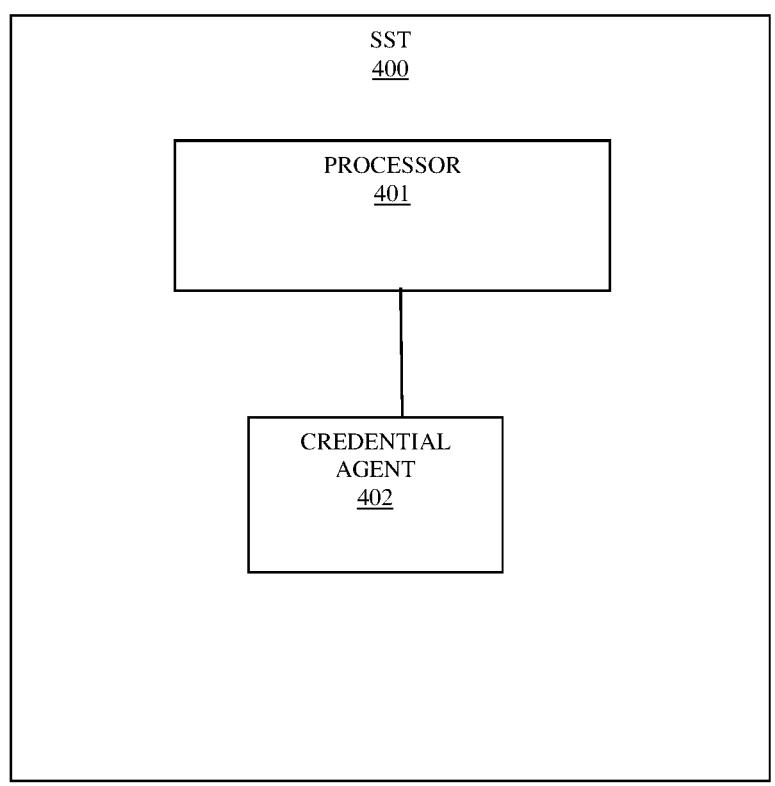
FIG. 4 is a diagram of a Self-Service Terminal (SST), according to an example embodiment.

FIG. 4 is a diagram of a SST 400, according to an example embodiment. The SST 400 includes a variety of hardware components and software components. The software components of the SST 400 are programmed and reside within memory and/or a non-transitory computer-readable medium and execute on one or more processors of the SST 400. The SST 400 may communicate over one or more networks, which can be wired, wireless, or a combination of wired and wireless.

In an embodiment, the SST 400 lacks any network connectivity during one mode of operation where the BIOS password is already set and communicated to a field engineer for a service job. For example, suppose the credential for the BIOS (BIOS password) is set on the SST 400 and then the SST 400 loses connectivity to any network. A service engineer can still service the SST 400 using the credential as received from a credential manager (as discussed above in the FIGS. 1 and 2).

In an embodiment, the SST 400 is the ATM 111 of the FIG. 1.

In an embodiment, the SST 400 is a kiosk.

In an embodiment, the SST 400 is a POS terminal.

The SST 400 includes a processor 401 and a credential agent 402.

The credential agent 402 is adapted and configured to: execute on the processor 401, communicate configuration information for the SST 400 over a network to a credential manager (such as credential manager 141 and the BIOS credential manager of the FIG. 2), receive a credential for accessing a BIOS from the credential manager, and replace an existing credential for accessing the BIOS with the credential on the SST 400.

In an embodiment, the credential agent 402 is the BIOS credential agent 114A of the FIG. 1.

In an embodiment, the credential agent 402 is the SST BIO credential agent of the FIG. 3.

In an embodiment, the credential agent 403 is further configured to re-flash the BIOS in memory of the SST 400 when the credential replaces the existing credential for accessing the BIOS.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   creating, by a remote device that is remote to a Self-Service Terminal (SST), an entry in a data store for a credential to access a Basic Input/Output System (BIOS) of the SST;

re-flashing, by the SST, the BIOS with the credential ensuring a previous credential for access to the BIOS is invalid and ensuring access to the BIOS requires the credential:

communicating, by the remote device, the credential to a service engineer device operated by a service engineer as a one-time use credential that allows a service engineer to securely access the BIOS on the SST;

receiving, by the SST, the one-time user credential from the service engineer;

providing, by the SST, access to the BIOS based on the one-time user credential; and managing, by the remote device, the credential and other credentials set for the BIOS and managing distribution of the credential and other credentials from the entry in the data store, wherein managing further includes receiving a notification that a session with the SST that utilized the credential has ended, generating, by the remote device, a new credential for the BIOS, providing, by the remote device, the new credential to the SST, and re-flashing, by the SST, the BIOS with the new credential ensuring access to the BIOS requires the new credential.

2. The method of claim 1, wherein creating further includes randomly generating the credential.

3. The method of claim 2, wherein randomly generating further includes processing random fields of configuration information provided by an agent executing on the SST when randomly generating the credential.

4. The method of claim 3, wherein processing further includes instructing the agent on the SST to set the credential for accessing the BIOS of the SST.

5. The method of claim 1, wherein communicating further includes sending the credential in response to a notification received from a service engineer job system of the service engineer.

6. The method of claim 5, wherein sending further includes receiving the notification from the service engineer job system based on a job assigned to the service engineer for servicing the SST.

7. The method of claim 6, wherein receiving further includes receiving an identifier for the service engineer device from the service engineer job system.

8. The method of claim 7 further comprising, receiving, by the remote device, an indication from the service engineer job system that the service engineer has completed servicing the SST.

* * * * *